US010550224B2

(12) United States Patent
Liu et al.

(10) Patent No.: US 10,550,224 B2
(45) Date of Patent: Feb. 4, 2020

(54) CHEMICAL-RESISTANT POLYESTER PRESSURE-SENSITIVE ADHESIVE

(71) Applicant: 3M INNOVATIVE PROPERTIES COMPANY, St. Paul, MN (US)

(72) Inventors: Richard Y. Liu, Woodbury, MN (US); Jingjing Ma, Cottage Grove, MN (US); Zhong Chen, Woodbury, MN (US); Victor Ho, St. Paul, MN (US); Nathaniel I. Lehn, White Lake Bear, MN (US); Harold T. Munson, Oakdale, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 66 days.

(21) Appl. No.: 15/752,988

(22) PCT Filed: Aug. 15, 2016

(86) PCT No.: PCT/US2016/047002
§ 371 (c)(1),
(2) Date: Feb. 15, 2018

(87) PCT Pub. No.: WO2017/031042
PCT Pub. Date: Feb. 23, 2017

(65) Prior Publication Data
US 2018/0237585 A1  Aug. 23, 2018

Related U.S. Application Data

(60) Provisional application No. 62/206,618, filed on Aug. 18, 2015, provisional application No. 62/355,989, filed on Jun. 29, 2016.

(51) Int. Cl.
| *C09J 7/22* | (2018.01) |
| *C08G 63/199* | (2006.01) |
| *C09J 167/06* | (2006.01) |
| *C08G 63/54* | (2006.01) |
| *C09J 7/38* | (2018.01) |
| *C08G 63/181* | (2006.01) |

(52) U.S. Cl.
CPC ......... *C08G 63/199* (2013.01); *C08G 63/181* (2013.01); *C08G 63/54* (2013.01); *C09J 7/22* (2018.01); *C09J 7/38* (2018.01); *C09J 167/06* (2013.01); *C08G 2170/40* (2013.01); *C09J 2203/30* (2013.01); *C09J 2467/00* (2013.01); *C09J 2467/006* (2013.01)

(58) Field of Classification Search
USPC .................................................. 528/271, 272
See application file for complete search history.

(56) References Cited

U.S. PATENT DOCUMENTS

| 4,122,073 | A | 10/1978 | Georgoudis |
| 5,278,199 | A | 1/1994 | Ohkawa |
| 5,371,112 | A | 12/1994 | Sayre |
| 5,656,681 | A | 8/1997 | Shimizu |
| 6,989,413 | B2 | 1/2006 | Hazen |
| 8,962,136 | B2 | 2/2015 | Takahira |
| 8,999,503 | B2 | 4/2015 | Takahira |
| 9,096,782 | B2 | 8/2015 | Takahira |
| 2004/0039136 | A1 | 2/2004 | Godi |
| 2012/0208016 | A1 | 8/2012 | Takahira |
| 2012/0208017 | A1 | 8/2012 | Yoshie |
| 2012/0301717 | A1 | 11/2012 | Takahira |
| 2014/0275379 | A1 | 9/2014 | Schmitt |

FOREIGN PATENT DOCUMENTS

| DE | 1595851 | 9/1969 |
| EP | 0558905 | 9/1993 |
| EP | 2583824 | 4/2013 |
| JP | 2007-099879 | 4/2007 |
| WO | WO 2001-60939 | 8/2001 |
| WO | WO 2015-093526 | 6/2015 |
| WO | WO 2017-030877 | 2/2017 |
| WO | WO 2017-030881 | 2/2017 |

OTHER PUBLICATIONS

International Search Report for PCT International Application No. PCT/US2016/047002, dated Nov. 22, 2016, 3 pages.

*Primary Examiner* — Terressa Boykin
(74) *Attorney, Agent, or Firm* — Clifton F. Richardson

(57) ABSTRACT

Polyester pressure-sensitive adhesives are described. The polyester includes at least two different diacid residues and at least two different diol residues. The at least two different diacid residues include, based on the total moles of the at least two diacid residues, 20 to 80 mole percent of a residue of at least one aromatic dicarboxylic acid, and 20 to 80 mole percent of at least one of a residue of adipic acid or sebacic acid. The polyesters may include at least one pendant group containing an alkenyl group.

21 Claims, 1 Drawing Sheet

CHEMICAL-RESISTANT POLYESTER PRESSURE-SENSITIVE ADHESIVE

BACKGROUND

Adhesives have been used for a variety of marking, holding, protecting, sealing and masking purposes. Adhesive tapes generally comprise a backing, or substrate, and an adhesive. One type of adhesive, a pressure-sensitive adhesive, is particularly useful for many applications.

Pressure-sensitive adhesives are well known to one of ordinary skill in the art to possess certain properties at room temperature including the following: (1) aggressive and permanent tack, (2) adherence with no more than finger pressure, (3) sufficient ability to hold onto an adherend, and (4) sufficient cohesive strength to be removed cleanly from the adherend. Materials that have been found to function well as pressure-sensitive adhesives are polymers designed and formulated to exhibit the requisite viscoelastic properties resulting in a desired balance of tack, peel adhesion, and shear strength. The most commonly used polymers for preparation of pressure-sensitive adhesives are natural rubber, synthetic rubbers (e.g., styrene/butadiene copolymers (SBR) and styrene/isoprene/styrene (SIS) block copolymers), various (meth)acrylate (e.g., acrylate and methacrylate) copolymers and silicones. Each of these classes of materials has advantages and disadvantages.

SUMMARY

In some aspects of the present description, a polyester including at least two different diacid residues and at least three different diol residues is provided. The at least two different diacid residues includes, based on the total moles of the at least two diacid residues: 20 to 80 mole percent of a residue of at least one aromatic dicarboxylic acid, and 20 to 80 mole percent of at least one of a residue of adipic acid or sebacic acid. The at least three different diol residues includes, based on the total moles of the at least three different diol residues: at least 5 mole percent of a first diol residue, at least 5 mole percent of a different second diol residue, and 0.1 to 10 mole percent of a residue of trimethylolpropane monoallyl ether. Each of the first and second diol residues is a residue of ethylene glycol, 1,6-hexanediol, 1,4-butanediol, neopentyl glycol, or 1,4-cyclohexanedimethanol.

In some aspects of the present description, a polyester including at least two different diacid residues and at least three different diol residues is provided. The at least two different diacid residues includes, based on the total moles of the at least two diacid residues: 20 to 80 mole percent of a residue of at least one aromatic dicarboxylic acid, and 20 to 80 mole percent of at least one of a residue of adipic acid or sebacic acid. The at least two different diol residues includes, based on the total moles of the at least two different diol residues: at least 5 mole percent of a first diol residue, and at least 5 mole percent of a different second diol residue. Each of the first and second diol residues is a residue of ethylene glycol, 1,6-hexanediol, 1,4-butanediol, neopentyl glycol, or 1,4-cyclohexanedimethanol. The residue of the at least one aromatic dicarboxylic acid comprises a residue of at least one of isophthalic acid, phthalic acid, terephthalic acid, bibenzoic acid, and naphthalic acid. The polyester is a pressure-sensitive adhesive.

In some aspects of the present description, a polyester including at least two different diacid residues and at least three different diol residues is provided. The at least two different diacid residues includes, based on the total moles of the at least two diacid residues, 20 to 80 mole percent of a residue of at least one aromatic dicarboxylic acid. The at least two different diol residues includes, based of the total moles of the at least two different diol residues, 0.1 to 10 mole percent of a diol residue comprising a pendant group containing an alkenyl group. The residue of the at least one aromatic dicarboxylic acid comprises a residue of at least one of isophthalic acid, phthalic acid, terephthalic acid, bibenzoic acid, and naphthalic acid. The polyester is a pressure-sensitive adhesive.

In some aspects of the present description, a polyester including at least two different diacid residues and at least three different diol residues is provided. The at least two different diacid residues includes, based on a total moles of the at least two different diacid residues, 20 to 80 mole percent at least one aromatic dicarboxylic acid residue. The polyester includes at least one pendant group containing an alkenyl group. A ratio of a total number of the at least one pendant group to the total number of ester groups in the polyester is in a range of 0.001 to 0.1. The residue of the at least one aromatic dicarboxylic acid comprises a residue of at least one of isophthalic acid, phthalic acid, terephthalic acid, bibenzoic acid, and naphthalic acid. The polyester is a pressure-sensitive adhesive.

In some aspects of the present description, a pressure-sensitive adhesive composition comprising the polyester is provided, and in some embodiments, a tape comprising the polyester or the pressure-sensitive adhesive composition is provided.

DETAILED DESCRIPTION

Figure 1:
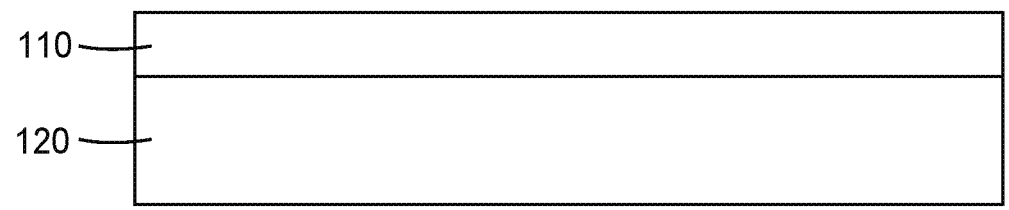
FIGS. 1-2 are schematic cross-sectional views of tapes comprising a polyester.

In the following description, reference is made to the accompanying drawings that forms a part hereof and in which various embodiments are shown by way of illustration. The drawings are not necessarily to scale. It is to be understood that other embodiments are contemplated and may be made without departing from the scope or spirit of the present disclosure. The following detailed description, therefore, is not to be taken in a limiting sense.

The use of adhesives, especially pressure-sensitive adhesives, in areas such as the medical, electronic and optical industries is increasing. The requirements of these industries place additional demands upon the pressure-sensitive adhesive beyond the traditional properties of tack, peel adhesion and shear strength. New classes of materials are desirable to meet the increasingly demanding performance requirements for pressure-sensitive adhesives.

Polyesters may be formed as the reaction product of diacids and diols. For example, terephthalic acid (a diacid) and ethylene glycol (a diol) can be reacted to form polyethylene terephthalate (PET). More generally, one or more diacids and one or more diols can be reacted, in equal molar portions of total diacids and total diols, to form a polyester comprising residues of the diacids and residues of the diols. The term residue when used in reference to the components of a polyester, refers to the moiety in the polyester resulting from the reaction of a corresponding monomer. In some cases, different monomers can produce the same moiety in the polyester and the moiety may be referred to as a residue of any of the monomers that result in the moiety in the polyester. For example, PET can be formed by the esterification reaction between terephthalic acid and ethylene glycol with water as a byproduct or by the transesterification reaction between dimethyl terephthalate and ethylene glycol with methanol as a byproduct. Since the residue of the terephthalic acid and the residue of the dimethyl terephthalate is the same moiety, the moiety may be referred to either as a residue of terephthalic acid or as a residue of dimethyl terephthalate regardless of how the polyester is formed.

Polyesters can be chain-extended or cross-linked in a solution phase reaction by utilizing a di-functional or a multifunctional isocyanate as a chain extending or crosslinking agent. In some cases, the resulting chain-extended or cross-linked polyester compositions can be used as adhesives but such adhesives typically exhibit poor shear strength.

The term "adhesive" refers to polymers or polymeric compositions useful to adhere together two adherends. An example of an adhesive is a pressure-sensitive adhesive. Pressure-sensitive adhesive compositions are well known to those of ordinary skill in the art to possess properties including the following: (1) aggressive and permanent tack, (2) adherence with no more than finger pressure, (3) sufficient ability to hold onto an adherend, and (4) sufficient cohesive strength to be cleanly removable from the adherend. Materials that have been found to function well as pressure-sensitive adhesives are polymers designed and formulated to exhibit the requisite viscoelastic properties resulting in a desired balance of tack, peel adhesion, and shear holding power. Obtaining the proper balance of properties is not a simple process.

According to the present description, polyesters, and compositions that include the polyesters, which offer improved performance as adhesives are described. In some embodiments, the polyester is a pressure-sensitive adhesive. In some embodiments, a pressure-sensitive adhesive composition including the polyester and tackifier at 1 to 60 weight percent, or 1 to 30 weight percent, or 1 to 15 weight percent is provided. In some embodiments, the polyester has sufficient adhesive properties without the need for including a tackifier. Polyesters, or compositions comprising the polyesters, having good pressure-sensitive adhesion properties typically have a low glass transition temperature (e.g., less than −10° C.) and a low shear or storage modulus (e.g., less than 0.3 MPa). Such properties of the polyesters of the present description are described further elsewhere herein.

In some embodiments, the polyesters include at least two different diacid residues and at least two different diol residues. In some embodiments, the at least two at least two different diacid residues include, based on the total moles of the at least two diacid residues, 20 to 80 mole percent of a residue of at least one aromatic dicarboxylic acid, and 20 to 80 mole percent of at least one of a residue of adipic acid or sebacic acid. In some embodiments, the residue of the at least one aromatic dicarboxylic acid comprises a residue of at least one of isophthalic acid, phthalic acid, terephthalic acid, bibenzoic acid, and naphthalic acid. In some embodiments, the at least two different diol residues include, based on the total moles of the at least two diol residues, at least 5 mole percent of a first diol residue and at least 5 mole percent of a different second diol residue. In some embodiments, the at least two different diol residues comprise at least three different diol residues which include at least 5 mole percent of a first diol residue, at least 5 mole percent of a different second diol residue, and 0.1 to 10 mole percent of a residue of trimethylolpropane monoallyl ether. In some embodiments, each of the first and second diol residues is a residue of ethylene glycol, 1,6-hexanediol, 1,4-butanediol, neopentyl glycol, or 1,4-cyclohexanedimethanol.

In some embodiments, the polyesters include one or more diacid residues or one or more diol residues which are crosslinkable by virtue of having crosslinkable pendant groups. The crosslinkable pendant groups may include one or more reactive unsaturated carbon-carbon bonds, e.g., alkene or alkyne, which could undergo efficient radical-based addition or propagation reactions. In some embodiments, the crosslinkable pendant group includes terminal alkene, substituted alkene, alkenyl, allyl, allyloxy, alkyne, cyclic alkene, (meth)acrylate or other reactive groups. The term (meth)acrylate group refers to acrylate groups, methacrylate groups, or a combination of acrylate and methacrylate groups. In some embodiments, the crosslinkable pendant groups include a carbon-carbon double bond (C=C). The polyesters may be crosslinkable by the application of actinic radiation (e.g., ultraviolet radiation or electron beam radiation) and/or may be crosslinkable by the application of heat (thermal-induced crosslinking). The polyesters of the present description offer advantages over other polyester containing adhesives. For example, the polyesters can be crosslinked with high efficiency and without low molecular weight monomer additives, the polyesters have improved chemical resistance, and/or the polyesters have improved impact resistance.

In some embodiments, a ratio of a total number of the at least one crosslinkable pendant groups in the polyester to a total number of ester groups in the polyester is in a range of 0.0001 to 0.5, or in a range of 0.001 to 0.2, or in a range of 0.001 to 0.1. In some embodiments, a ratio of a total number of the at least one crosslinkable moiety to a total number of ester groups in the polyester is in a range of 0.0001 to 0.5, or in a range of 0.001 to 0.2, or in a range of 0.001 to 0.1.

In some embodiments, the polyester is made by reacting precursors that include at least one diacid, at least one diol not containing a crosslinkable pendant group, and at least one monomer containing a crosslinkable pendant group. In some embodiments, the at least one diacid includes at least two diacids and in some embodiments, the at least one diol not containing a crosslinkable pendant group includes at least two diols. A pendant group may refer to a side group attached to a backbone chain of a polymer. A monomer may be said to contain a pendant group if it contains a group which becomes a side group upon polymerization. A ratio of the number of molecules of the at least one monomer to a sum of the number of molecules of the at least one diacid and the number of molecules at least one diol may be in a range of 0.0001 to 0.5, or in a range of 0.001 to 0.2, or in a range of 0.001 to 0.1. In some embodiments, a ratio of the number of molecules of the at least one diacid to the number of molecules of the at least one diol is in a range of 0.85 to 1.15, or 0.9 to 1.1. In some embodiments, the at least one monomer containing a crosslinkable pendant group may be an alkene- or alkyne-containing diacid or diol or diester. It will be understood that the polyesters of the present description can be alternatively made by substituting diesters for diacids in the reactive precursors.

Each moiety containing a crosslinkable pendant group may include a carbon-carbon double bond and in some embodiments may be represented by the general Formula 1 below:

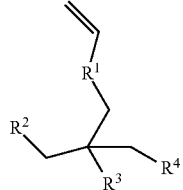

Formula 1 wherein:

$R^1$ is —O—, —(CH$_2$)n-, —C(=O)O—, —OCH$_2$O—, —OC(=O)—, —S—, —(C=O)—, or a combination thereof;

$R^2$ is —OH, —CO$_2$H or —R$^{2'}$—, wherein —R$^{2'}$— is —O—, —C(=O)O—, —(CH$_2$)$_n$—, —(C=O)—, —S—, or a combination thereof;

$R^3$ is —H, —CH$_3$, —OH, —CH$_2$OH, —(CH$_2$)$_m$CH$_3$, —SO$_3$Na, —CO$_2$Na, or a combination thereof; and $R^4$ is —O—, —C(=O)O—, —(CH$_2$)p-, —(C=O)—, —S— or a combination thereof.

Here, n, m and p are integers greater than 0. For example, n, m and p may each be independently in the range of 1 to 100, or independently in a range of 1 to 20, or independently in a range of 1 to 18. In some embodiments, an end group of the polyester may comprise the moiety (e.g., $R^2$ may be —CO$_2$H, or —OH). In some embodiments, the moiety is a diol residue that may be represented by the Formula 2 below:

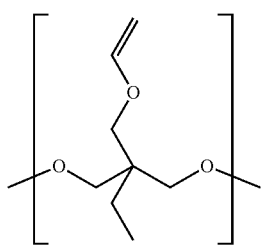

Formula 2

In some embodiments, the polyester may be made by reacting precursors that include at least one diacid, at least one diol not containing a crosslinkable pendant group, and a monomer which forms the moiety having the crosslinkable pendant group. In some embodiments, the monomer may be selected to give a moiety represented by the general Formula 1 above. In some embodiments, the monomer is trimethylolpropane monoallyl ether (TMPME) which can form the moiety represented by Formula 2. In other exemplary embodiments, monomers represented by any of Formulas 3 to 5 may be chosen.

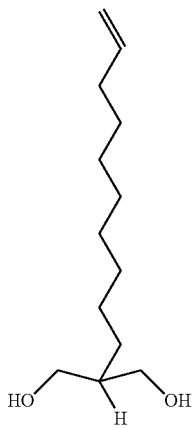

Formula 3

Formula 4

Formula 5

The monomers represented by Formulas 3 to 5 are diols. In other embodiments, monomers represented by any of the Formulas 3 to 5 with the —OH groups replaced by —CO$_2$H groups (or alternatively by ester groups) may be used. In some embodiments, the pendant groups of the moiety generating monomer have at least 3 functionalities, among which 2 of them are either —OH or —CO$_2$H terminated while the third one is neither —OH nor —CO$_2$H. The third pendant functional group may be terminated by a C=C bond. Other suitable possibilities are provided in Formula 1. Further possibilities for the crosslinkable pendant groups are provided in Formulas 6 to 9 where R represents a constituent of the backbone of the polyester; $R^5$ is independently —CH$_2$— or —O—; $R^6$ is independently —CH$_3$ or —H; and $R^7$ is —(CH$_2$)$_m$—, where m in an integer from 1 to 4.

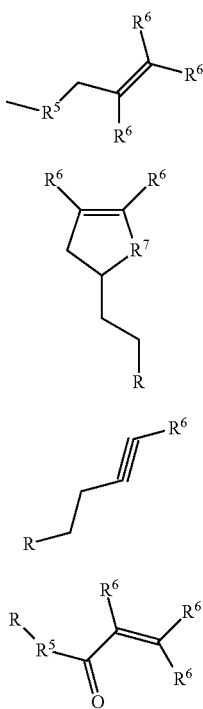

Formula 6

Formula 7

Formula 8

Formula 9

In some embodiments, the polyesters are formed by reacting precursors (e.g., in an esterification reaction) that include at least one acid (e.g., a diacid such as a dicarboxylic acid or a polyacid such as a polycarboxylic acid), at least one alcohol (e.g., a diol or a polyol), and at least one monomer containing at least one crosslinkable pendant group. Examples of suitable acids include terephthalic acid (e.g., 1,4-terephthalic acid), 1,4-naphthalenedicarboxylic acid, isophthalic acid, phthalic acid, 2,6-naphthalenedicarboxylic acid, diphenyldicarboxylic acid, succinic acid, adipic acid, azelaic acid, sebacic acid, dodecanedioic acid, 1,4-cyclohexanedicarboxylic acid, bibenzoic acid, naphthalic acid, and combinations thereof. Examples of suitable alcohols include ethylene glycol, diethylene glycol, triethylene glycol, polyethylene glycol, propylene glycol, dipropylene glycol, polypropylene glycol, 1,3-butanediol, 1,4-butanediol, 1,6-hexanediol, neopentyl glycol, 1,4-cyclohexanedimethanol, and combinations thereof. Suitable monomers containing at least one crosslinkable pendant group include those selected to give a moiety represented by the general Formula 1 above. In some embodiments, the at least one monomer containing at least one crosslinkable pendant group may be one or more diol monomers, one or more diacid monomers, or a combination of diol and diacid monomers.

A polyester which does not dissolve and which does not detached from a substrate to which it is adhered when exposed to a chemical for a specified time at a specified temperature may be described as chemical resistant. For example, a polyester may maintain adhesion and not dissolve when submerged in either oleic acid or a mixture of isopropyl alcohol (IPA) and water at a weight ratio of 70:30 (IPA/$H_2O$) at 70° C. for 8 hrs.

Utilizing at least one aromatic dicarboxylic acid has been found to provide enhanced chemical resistance over utilizing only non-aromatic diacids. In some embodiments, the polyester includes, based on the total moles of diacid residues, 20 to 80 mole percent, or 30 to 70 mole percent, or 40 to 60 mole percent, or about 50 mole percent, of a residue of at least one aromatic dicarboxylic acid. In some embodiments, the polyester also includes residues of at least two different diols, or at least three different diols. Is some embodiments, the at least two different diols, or the at least three different diols, include at least one diol containing a crosslinkable pendant group as described further elsewhere herein. In some embodiments, the polyester further includes residues of polyols or polyacids.

In some embodiments, the polyesters are formed by reacting precursors that include at least one diacid, at least one diol, and, optionally, at least one monomer containing a crosslinkable pendant group. Monomers in the at least one monomer containing a crosslinkable pendant group may be diols or diacids, for example, or may be other suitable monomers. The reaction between the diols, the diacids and the monomers containing the pendant group may be catalyzed by tetrabutyl titanate, cobalt acetate, zinc acetate, antimony triacetate, and/or other metal acetates. Stabilizers such as triethyl phosphonoacetate may be included to stabilize the catalyst after the reaction. Branching agents such as trimethylol propane may also be used in the reaction.

The polyester or polyester composition may be an adhesive, and may be a pressure-sensitive adhesive, without crosslinking the polyester. However, in some embodiments, the properties of the adhesive (e.g., modulus, bond strength, etc.) can be improved by crosslinking (curing) the polyester, which can be done by applying actinic radiation, for example. The adhesive may have adequate adhesion properties without the addition of a plasticizer, but a plasticizer may optionally be included. For example, in some embodiments, an adhesive composition comprises the polyester at 99 to 40 weight percent and comprises tackifier at 1 to 60 weight percent. In some embodiments, the adhesive composition includes other additives or ingredients in addition to the polyester and the tackifier. In some embodiments, the tackifier is included at 10 to 60 weight percent, or at 20 to 50 weight percent. In some embodiments, the tackifier is included at 1 to 30 weight percent, or at 1 to 15 weight percent. The tackifier may be any suitable compound or compounds for increasing the tack or stickiness of the adhesive. Suitable tackifiers include C5 hydrocarbons, C9 hydrocarbons, aliphatic resins, aromatic resins, terpenes, terpenoids, terpene phenolic resins, rosins, rosin esters, and combinations thereof. Suitable tackifiers include ARKON P140 which has a softening point of 140° C. and which is available from Arakawa Europe GnbH, Germany, CLEARON P150 which has a softening point of 150° C. and which is available from Yasuhara Chemical Co., Japan, and ENDEX 160 which has a softening point of 160° C. and which is available from Eastman Chemical Company, Kingsport, Tenn. In some embodiments, the tackifier is a terpene phenol resin such as SP-560 which has a softening point of 155° C. and which is available from SI Group Inc., Schenectady, N.Y. In some embodiments, the tackifier has a softening point no less than 140° C. In some embodiments, the tackifier has a softening point of at least 140° C. and less than 190° C., or less than 180° C.

In some embodiments, the polyesters have a glass transition temperature (Tg) determined by differential scanning calorimetry (DSC) less than 0° C., or less than −10° C., or less than −20° C. or less than −30° C. In some embodiments, the glass transition temperature is in a range of −60° C. to −10° C., or in a range of −50° C. to −10° C.

In some embodiments, the polyesters prior to curing (crosslinking) have a shear modulus at 1 Hz and 23° C. that is less than 1 MPa, or less than 0.5 MPa, or less than 0.3, or less than 0.2 MPa. In some embodiments, the shear modulus is in a range of 0.001 MPa to 1 MPa. The shear modulus refers to the real part of the complex shear modulus, which may be denoted G' (G prime) based on Dynamic Mechanical Analysis (DMA), unless specified differently. A tan δ value may also be determined by DMA. Unless specified differently, tan δ values specified herein refer to the tan δ value determined by DMA.

In some embodiments, the polyesters have a weight-average molecular weight (Mw) in a range of 40 to 4000 kg/mole, or in a range of 100 to 1000 kg/mole, or in a range of 200 kg/mole to 500 kg/mole. In some embodiments, the weight-average molecular weight is at least 60 kg/mole, or at least 100 kg/mole, or at least 200 kg/mole. The weight-average molecular weight (Mw) refers the Mw value determined using gel permeation chromatography (GPC) unless specified differently. The number-average molecular weight (Mn) can also be determined using gel permeation chromatography (GPC). In some embodiments, the polyesters have a polydispersity index (Mw/Mn) is in a range of 3 to 60, or in a range of 3 to 30, or in a range of 3 to 20.

In some embodiments, the polyesters of the present description have an intrinsic viscosity in the range of 0.8 to 2 dL/g or in a range of 1.0 to 1.6 dL/g. Intrinsic viscosity of a polymer refers to the difference in viscosity of a solution of the polymer in solvent and the solvent without the polymer divided by the product of the concentration of the polymer and the viscosity of the solvent without the polymer in the limit of small concentration. Unless specified differently, the solvent used to determine the intrinsic viscosity of the polyester is a 60/40 weight percent mixture of phenol/o-dichlorobenzene and the intrinsic viscosity is determined at 23° C. using an Ubbelohde capillary viscometer.

The crystallinity of the polyesters can be determined from the heat of melting ($\Delta H_m$) determined using differential scanning calorimetry (DSC). In some embodiments, the polyesters have a crystallinity corresponding to a melting endotherm of less than 20 J/g, or less than 10 J/g, or less than 5 J/g, or less than 1 J/g, or substantially zero. The crystallinity may be said to be substantially zero if a statistically meaningful non-zero value of the melting endotherm cannot be measured using standard DSC techniques. In some embodiments, the polyester will not crystallize and so the polyester does not have a melting point.

In some embodiments, the polyesters after curing (e.g., crosslinking via applying actinic radiation) have a shear modulus at 1 Hz and 23° C. that is less than 300,000 Pa, or less than 200,000 Pa. In some embodiments, the polyesters after curing have a shear modulus at 1 Hz and 23° C. in a range of 0.001 MPa to 1 MPa. In some embodiments, the polyesters after curing have a shear modulus at 1 Hz and 70° C. that is at least 20,000 Pa. In some embodiments, the polyesters after curing have a shear modulus at 1 Hz and 100° C. that is at least 10,000 Pa In some embodiments, the polyesters after curing have a shear modulus at 1 Hz and 130° C. that is at least 10,000 Pa.

In some embodiments, the polyesters have a tan δ as determined by DMA that is less than 0.7 at 23° C. after curing. In some embodiments, the polyesters have a tan δ less than 0.8 at 70° C. after curing, based on DMA. In some embodiments, the polyesters have a tan δ less than 0.8 at 100° C. after curing, based on DMA. In some embodiments, the polyesters have a tan δ less than 0.8 at 130° C. after curing, based on DMA.

In some embodiments, the polyester is a pressure-sensitive adhesive having good impact or drop resistance. Impact resistance or drop resistance refers to the ability of the polyester to maintain adhesion between two adherents when subjected to repeated impacts. For example, a polyester pressure-sensitive adhesive can be used to laminate an aluminum plate and a polycarbonate plate together and the laminate repeatedly dropped up to 30 times each from 1 meter, then 1.2 meters, and then 2.0 meters, for example. The drop resistance can be characterized by the number of drops without the plates delaminating.

Crosslinking density can be characterized by using gel content as an indication of the degree of crosslinking. It has been found that drop resistance is improved when the polyester has a glass transition temperature in a range of −50° C. to −10° C. and/or has a crosslinking density of less than 35 percent as determined by gel-percent test. For example, in the drop test described above, the laminate can, in some embodiments, survive at least 40, at least 60, at least 85, or at least 90 such drops. Gel-percent testing can be used to determined crosslinking density as specified in the ASTM D 3616-95 test standard. In brief summary, the gel percent is determined by subjecting a sample to extraction in tetrahydrofuran, determining the weight lost during extraction, and calculating the extract percent and the gel percent from:

$$\text{Extract \%} = \frac{\text{weight lost during extraction}}{\text{weight of original specimen}} \times 100$$

$$\text{Gel percent} = 100 - \text{Extract \%}$$

Except where specified differently, the crosslinking density of the polyesters of the present description refers to the gel percent determined according to the ASTM D 3616-95 test standard.

In some embodiments, it may be desired that a polyester pressure-sensitive adhesive be both drop resistant and chemical resistant. In such embodiments, the polyester may have a glass transition temperature in a range of −50° C. to −10° C., a crosslinking density of less than 35 percent as determined by gel-percent test, and may include, based on the total moles of the at least two diacid residues, 20 to 80 mole percent of a residue of at least one aromatic dicarboxylic acid. In some applications, chemical resistance may be more important than drop resistance. In such applications, the crosslinking density may be higher than 35 percent. For example, in some embodiments, the polyester has a crosslinking density of 20 to 60 percent as determined by gel-percent test.

In some embodiments, a tape that includes the polyester, or an adhesive composition including the polyester, disposed on a substrate is provided.

FIG. 1 is a schematic cross-sectional view of tape 100 including adhesive 110 disposed on a substrate 120. Adhesive 110 can be any of the polyester adhesives or polyester adhesive compositions described herein. Substrate 120 can be any substrate conventionally used in a tape (e.g., PET). Alternatively, the substrate 120 can be a polyester including a residue of at least one aromatic dicarboxylic acid. For example, instead of forming PET from a reaction of terephthalic acid and ethylene glycol, a portion of the terephthalic acid can be replaced with isophthalic acid, or other aromatic dicarboxylic acid(s), to produce a polyester including a residue of at least one aromatic dicarboxylic acid.

Figure 2:
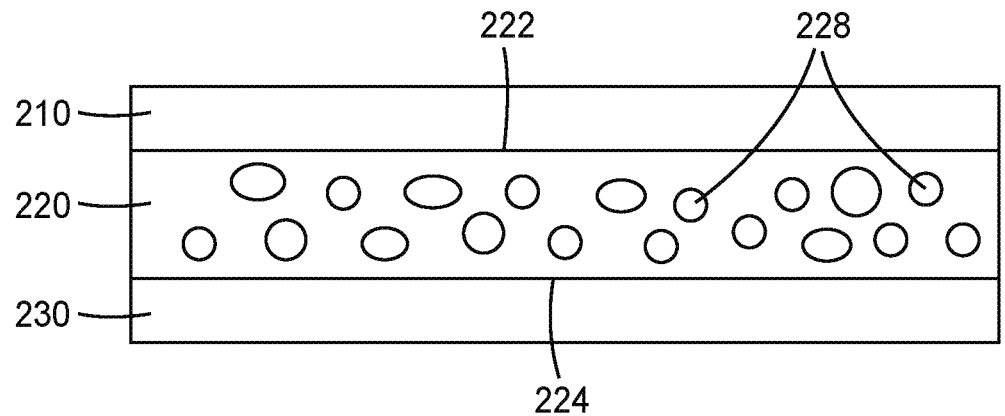

FIG. 2 is a schematic illustration of tape 200 including first layer 210, second layer 220 and a third layer 230. The first layer 210 is disposed directly on a first major surface 222 of the second layer 220, the third layer 230 is disposed directly on a second major surface 224 of the second layer 230 opposite the first major surface of the second layer 220. The first and third layers 210 and 230 each include a polyester of the present description or a pressure-sensitive adhesive composition including a polyester of the present description. Second layer 220 can be any substrate conventionally used in a tape or can be a polyester including a residue of at least one aromatic dicarboxylic acid. In some embodiments, second layer 220 is foamed and includes a plurality of cells 228 which may be filled with air or nitrogen or inert gases, for example. In some embodiments, the foamed layer is made by including a foaming agent in the composition used to form the second layer 120. The foaming agent may include one or more of a surfactant, a chemical foaming agent, a blowing agent or any agent that can form gas in the layer. In some embodiments, the foaming agent is included in the composition at 0.5 to 6.0 weight percent. Suitable foaming agents include azodicarbonamide, sodium bicarbonate, citric acid, and ECOCELL-P which is available from Polyfil Corporation, Rockaway, N.J. In alternative embodiments, the plurality of cells 228 in the foamed layer 220 are formed by direct injection of gas into a composition which is extruded to form the foamed layer 220. The foamed layer may be included in a tape to provide a damping effect (e.g., vibration damping) in articles including the tape.

Either of the tapes 100 or 200 can be made by coextrusion of the layers of the tapes. Either of the tapes 100 or 200 may be provided with a release layer adjacent the adhesive layer(s).

The peel strength of the tapes of the present description can be tested using standard peel test specifications such as that of D3330/D3330M-04(2010). In some embodiments, the peel strength of tape 100 or tape 200 is at least 300 g/cm, or at least 1000 g/cm, or at least 2000 g/cm, or in a range of 300 g/cm to 10000 g/cm when tested at a 180 degree peel from a stainless steel substrate at a peel rate of 300 mm/minute.

Impact-resistance polyester pressure-sensitive adhesives related to the polyesters of the present description are described in co-pending U.S. Provisional Application entitled "IMPACT-RESISTANT POLYESTER PRESSURE-SENSITIVE ADHESIVE", filed on an even date herewith, and hereby incorporated herein by reference to the extent that it does not contradict the present description. Related polyesters are described in U.S. Prov. Pat. App. No. 62/206,618 (Liu et al.), filed on Aug. 18, 2015, which is hereby incorporated herein by reference to the extent that it does not contradict the present description.

EXAMPLES

Test Methods
Differential Scanning Calorimetry (DSC)

The glass transition temperature (Tg) and crystal melting enthalpy (ΔHm) were measured using a Differential Scanning calorimeter (DSC) Model Q-1000 (commercially available from TA Instruments, New Castle, Del.). The heating rate was 20° C./min.

Dynamic Mechanical Analysis (DMA)

The storage modulus refers to the real part of the complex shear modulus, denoted G' (G prime), and was measured using Dynamic Mechanical Analysis (DMA) tester Model G2 ARES (commercially available from TA Instruments, New Castle, Del.). Tests were performed at 1 Hz and 23° C.

Peel Adhesion Strength

Specimens were prepared by slitting test strips 12.7 mm×127 mm in dimension from each of the adhesive tapes prepared. Two replicate specimens were prepared for each Example. The exposed adhesive surface of a test strip was adhered along the length of a Type 304 stainless steel (SS) plate with a bright annealed finish (ChemInstruments, Incorporated, Fairfield, Ohio), measuring 5.1 cm wide by 12.7 cm long by 0.12 cm thick. The test strip was rolled down 5 times using a 2.0 kg rubber roller. The plate was cleaned prior to applying the tape by wiping with acetone once and then with heptane three times using a tissue paper (trade designation KIMWIPE, available from Kimberly-Clark Corporation, Irving, Tex.). After being conditioned for 72 hours at 50% relative humidity (RH) at room temperature (RT), the peel adhesion strength was evaluated using an MTS INSIGHT tensile tester (MTS Systems Corporation, Eden Prairie, Minn.) equipped with a 1000 N load cell, using a crosshead speed of 300 mm/min, at an angle of 180° with the test specimen held in the bottom clamp and the tail in the top clamp. The average peel adhesion strength of two test specimens was reported in g/cm.

Chemical Resistance Test

For each of the polyester Examples, the polymer was hot melt extruded in a twin screw extruder. The extruder melt temperature was controlled to 176° C. and screw speed was 100 rpm. The melt was cast onto a release liner to form an adhesive transfer tape of 50 micrometer thickness. The resulting tape was then slit into strips of 0.5 inch×0.5 inch (1.27 cm×1.27 cm) for each of the adhesive transfer tapes prepared. Then, the release liner on one surface was removed and the test strip was adhered to the bottom of a petri dish. The release liner on the second, exposed surface of the test strip was then removed and the petri dish containing the attached sample test strip was set aside to dwell at room temperature (about 23° C.) for 15 mins. The test strip was then submerged in a mixture of isopropyl alcohol and water at a weight ratio of 70:30 (IPA/$H_2O$) at 70° C. for 8 hrs. The resistance of the adhesive sample to IPA/$H_2O$ mixture was rated using the guidelines shown in Table 1, and recorded.

TABLE 1

Chemical Resistance Evaluation Criteria

| Observation/Criteria | Chemical Resistance Rating |
|---|---|
| Adhesive sample came off the petri dish or dissolved completely | 1 (poor) |
| Adhesive sample partially detached or dissolved along the edge | 3 (fair) |
| Adhesive sample did not detach or dissolve | 5 (good) |

Raw Materials

The materials used in the polyester syntheses are shown in Table 2. All are available from Sigma Aldrich Corp., St. Louis, Mo.

TABLE 2

Materials Used in Examples

| Abbreviation | Material |
|---|---|
| TereAc | Terephthalic acid, CAS# 100-21-0 |
| IsoAc | Isophthalic acid, CAS# 121-91-5 |
| AdAc | Adipic acid, CAS# 124-04-9 |
| SebAc | Sebacic acid, CAS# 111-20-6 |
| EG | Ethylene glycol, CAS# 107-21-1 |
| HD | 1,6-hexanediol, CAS# 629-11-8 |

TABLE 2-continued

Materials Used in Examples

| Abbreviation | Material |
|---|---|
| NPG | Neopentyl glycol, CAS# 126-30- |
| CHDM | 1,4-cyclohexane dimethanol, CAS# 105-08-8 |
| TMP | Trimethylolpropane, CAS# 77-99-6 |
| TMPME | Trimethylolpropane monoallyl ether, CAS# 682-11-1 |

EXAMPLES

Comparative Example CE 1

This polyester composition was synthesized in a 8000 cc reactor with the following raw material charge: ethylene glycol (49.5 parts by mole of total diols), 1,6-hexanediol (50 parts by mole of total diols), trimethylolpropane (0.5 parts by mole of total diols), adipic acid (90 parts by mole of total acids), isophthalic acid (10 parts by mole of total acids), tetrabutyl titanate (450 ppm by total theoretical polymer weight based on monomers charged), and triethylphosphonoacetate (450 ppm by total theoretical polymer weight based on monomers charged). The mixture was heated to a temperature of 248° C. at a pressure of two atmospheres (270 kPa) and the mixture allowed to react while removing the water by-product. After completing the reaction and removing water, the pressure was reduced to the 0.5 to 5 mmHg range while heating to 271° C. The condensation by-product was continuously removed until a polymer of viscous nature was produced.

The Mw of the resulting polyester determined by GPC was 83 kg/mol and the polydispersity index was 22. The Tg determined by DSC was −52° C. This polyester was semi-crystalline with ΔHm of 15 J/g by DSC. The chemical resistance of the resulting PSA tape was rated as 1 (poor).

Comparative Example CE 2

This polyester composition was synthesized in a 8000 cc reactor with the following raw material charge: ethylene glycol (6 parts by mole of total diols), 1,6-hexanediol (70 parts by mole of total diols), 1,4-cyclohexane dimethanol (20 parts by mole of total diols), trimethylolpropane (2 parts by mole of total diols), trimethylolpropane monoallyl ether (2 parts by mole of total diols), sebacic acid (90 parts by mole of total acids), isophthalic acid (10 parts by mole of total acids), tetrabutyl titanate (450 ppm by total theoretical polymer weight based on monomers charged), and triethylphosphonoacetate (450 ppm by total theoretical polymer weight based on monomers charged). The mixture was heated to a temperature of 248° C. at a pressure of two atmospheres (270 kPa) and the mixture allowed to react while removing the water by-product. After completing the reaction and removing water, the pressure was reduced to the 0.5 to 5 mmHg range while heating to 271° C. The condensation by-product was continuously removed until a polymer of viscous nature was produced.

The Tg of the resulting polyester determined by DSC was −48° C. This polyester was free of crystallinity with ΔHm of 0 J/g by DSC. The chemical resistance of the resulting PSA tape was rated as 1 (poor).

Example 1

This polyester composition was synthesized in a 8000 cc reactor with the following raw material charge: ethylene glycol (6 parts by mole of total diols), 1,6-hexanediol (70 parts by mole of total diols), 1,4-cyclohexane dimethanol (20 parts by mole of total diols), trimethylolpropane (2 parts by mole of total diols), trimethylolpropane monoallyl ether (2 parts by mole of total diols), adipic acid (80 parts by mole of total acids), isophthalic acid (20 parts by mole of total acids), tetrabutyl titanate (450 ppm by total theoretical polymer weight based on monomers charged), and triethylphosphonoacetate (450 ppm by total theoretical polymer weight based on monomers charged). The mixture was heated to a temperature of 248° C. at a pressure of two atmospheres (270 kPa) and the mixture allowed to react while removing the water by-product. After completing the reaction and removing water, the pressure was reduced to the 0.5 to 5 mmHg range while heating to 271° C. The condensation by-product was continuously removed until a polymer of viscous nature was produced.

The Mw of the resulting polyester determined by GPC was 277 kg/mol and the polydispersity index was 13. The Tg determined by DSC was −41° C. This polyester was free of crystallinity with ΔHm of 0 J/g by DSC. The storage modulus at room temperature (G') was $4 \times 10^4$ Pa as determined by Dynamic Mechanical Analysis (DMA). The chemical resistance of the resulting PSA tape was rated as 3 (fair).

Example 2

This polyester composition was synthesized in a 8000 cc reactor with the following raw material charge: ethylene glycol (16 parts by mole of total diols), 1,6-hexanediol (25 parts by mole of total diols), neopentyl glycol (25 parts by mole of total diols), 1,4-cyclohexane dimethanol (25 parts by mole of total diols), trimethylolpropane (1 parts by mole of total diols), trimethylolpropane monoallyl ether (8 parts by mole of total diols), sebacic acid (70 parts by mole of total acids), isophthalic acid (30 parts by mole of total acids), tetrabutyl titanate (450 ppm by total theoretical polymer weight based on monomers charged), and triethylphosphonoacetate (450 ppm by total theoretical polymer weight based on monomers charged). The mixture was heated to a temperature of 248° C. at a pressure of two atmospheres (270 kPa) and the mixture allowed to react while removing the water by-product. After completing the reaction and removing water, the pressure was reduced to the 0.5 to 5 mmHg range while heating to 271° C. The condensation by-product was continuously removed until a polymer of viscous nature was produced.

The Mw of the resulting polyester determined by GPC was 384 kg/mol and the polydispersity index was 13. The Tg determined by DSC was −38° C. This polyester was free of crystallinity with ΔHm of 0 J/g by DSC. The storage modulus at room temperature (G') was $1 \times 10^5$ Pa as determined by Dynamic Mechanical Analysis (DMA). The chemical resistance of the resulting PSA tape was rated as 5 (good).

Example 3

This polyester composition was synthesized in a 8000 cc reactor with the following raw material charge: ethylene glycol (7 parts by mole of total diols), 1,6-hexanediol (60 parts by mole of total diols), 1,4-cyclohexane dimethanol (30 parts by mole of total diols), trimethylolpropane (1 parts by mole of total diols), trimethylolpropane monoallyl ether (2 parts by mole of total diols), sebacic acid (50 parts by mole of total acids), isophthalic acid (50 parts by mole of total acids), tetrabutyl titanate (450 ppm by total theoretical polymer weight based on monomers charged), and triethylphosphonoacetate (450 ppm by total theoretical polymer weight based on monomers charged). The mixture was heated to a temperature of 248° C. at a pressure of two atmospheres (270 kPa) and the mixture allowed to react while removing the water by-product. After completing the reaction and removing water, the pressure was reduced to the 0.5 to 5 mmHg range while heating to 271° C. The condensation by-product was continuously removed until a polymer of viscous nature was produced.

The Mw of the resulting polyester determined by GPC was 155 kg/mol and the polydispersity index was 6.1. The Tg determined by DSC was −26° C. This polyester was free of crystallinity with ΔHm of 0 J/g by DSC. The storage modulus at room temperature (G') was $1 \times 10^5$ Pa as determined by Dynamic Mechanical Analysis (DMA). The chemical resistance of the resulting PSA tape was rated as 5 (good).

Example 4

This polyester composition was synthesized in a 8000 cc reactor with the following raw material charge: ethylene glycol (7 parts by mole of total diols), 1,6-hexanediol (30 parts by mole of total diols), neopentyl glycol (30 parts by mole of total diols), 1,4-cyclohexane dimethanol (30 parts by mole of total diols), trimethylolpropane (1 parts by mole of total diols), trimethylolpropane monoallyl ether (2 parts by mole of total diols), sebacic acid (30 parts by mole of total acids), isophthalic acid (70 parts by mole of total acids), tetrabutyl titanate (450 ppm by total theoretical polymer weight based on the monomers charged), and triethylphosphonoacetate (450 ppm by total theoretical polymer weight based on the monomers charged). The mixture was heated to a temperature of 248° C. at a pressure of two atmospheres (270 kPa) and the mixture allowed to react while removing the water by-product. After completing the reaction and removing water, the pressure was reduced to the 0.5 to 5 mmHg range while heating to 271° C. The condensation by-product was continuously removed until a polymer of viscous nature was produced.

The Mw of the resulting polyester determined by GPC was 201 kg/mol and the polydispersity index was 9.7. The Tg determined by DSC was 6° C. This polyester was free of crystallinity with ΔHm of 0 J/g by DSC. The chemical resistance of the resulting pressure sensitive adhesive tape was rated as 5 (good).

Example 5

This polyester composition was synthesized in a 8000 cc reactor with the following raw material charge: ethylene glycol (7 parts by mole of total diols), 1,6-hexanediol (30 parts by mole of total diols), neopentyl glycol (30 parts by mole of total diols), 1,4-cyclohexane dimethanol (30 parts by mole of total diols), trimethylolpropane (1 parts by mole of total diols), trimethylolpropane monoallyl ether (2 parts by mole of total diols), sebacic acid (20 parts by mole of total acids), isophthalic acid (80 parts by mole of total acids), tetrabutyl titanate (450 ppm by total theoretical polymer weight based on the monomers charged), and triethylphosphonoacetate (450 ppm by total theoretical polymer weight based on the monomers charged). The mixture was heated to a temperature of 248° C. at a pressure of two atmospheres (270 kPa) and the mixture allowed to react while removing the water by-product. After completing the reaction and removing water, the pressure was reduced to the 0.5 to 5 mmHg range while heating to 271° C. The condensation by-product was continuously removed until a polymer of viscous nature was produced.

The Mw of the resulting polyester determined by GPC was 197 kg/mol and the polydispersity index was 10. The Tg determined by DSC was 20° C. This polyester was free of crystallinity with ΔHm of 0 J/g by DSC. The chemical resistance of the resulting adhesive tape was rated as 5 (good).

Comparative Example 3

This polyester composition was synthesized in a 8000 cc reactor with the following raw material charge: ethylene glycol (100 parts by mole of total diols), terephthalic acid (100 parts by mole of total acids), tetrabutyl titanate (450 ppm by total theoretical polymer weight based on monomers charged), and triethylphosphonoacetate (450 ppm by total theoretical polymer weight based on monomers charged). The mixture was heated to a temperature of 248° C. at a pressure of two atmospheres (270 kPa) and the mixture allowed to react while removing the water by-product. After completing the reaction and removing water, the pressure was reduced to the 0.5 to 5 mmHg range while heating to 271° C. The condensation by-product was continuously removed until a polymer of viscous nature was produced.

The Mw of the resulting polyester determined by GPC was 65 kg/mol and the polydispersity index was 2.5. The Tg determined by DSC was 79° C. This polyester is semicrystalline with ΔHm of 35 J/g by DSC. The resulting polyester did not adhere to substrates and its chemical resistance was rated as 1 (poor).

Comparative Example 4

This polyester composition was synthesized in a 8000 cc reactor with the following raw material charge: ethylene glycol (70 parts by mole of total diols), 1,4-cyclohexane dimethanol (30 parts by mole of total diols), terephthalic acid (100 parts by mole of total acids), tetrabutyl titanate (450 ppm by total theoretical polymer weight based on monomers charged), and triethylphosphonoacetate (450 ppm by total theoretical polymer weight based on monomers charged). The mixture was heated to a temperature of 248° C. at a pressure of two atmospheres (270 kPa) and the mixture allowed to react while removing the water by-product. After completing the reaction and removing water, the pressure was reduced to the 0.5 to 5 mmHg range while heating to 271° C. The condensation by-product was continuously removed until a polymer of viscous nature was produced.

The Mw of the resulting polyester determined by GPC was 75 kg/mol and the polydispersity index was 2.5. The Tg determined by DSC was 80° C. This polyester is free of crystallinity with ΔHm of 0 J/g by DSC. The resulting polyester did not adhere to substrates and its chemical resistance was rated as 1 (poor).

Table 3 provides a summary of the compositions and Table 4 provides a summary of the results of Examples 1-5 and Comparative Examples CE1-CE4.

TABLE 3

Polyester Compositions of Examples 1-5 and Comparative Examples CE1-CE4

| Example | TereAc | IsoAc | AdAc | SebAc | EG | HD | NPG | CHDM | TMP | TMPME |
|---|---|---|---|---|---|---|---|---|---|---|
| C. E. 1 | 0 | 10 | 90 | 0 | 49.5 | 50 | 0 | 0 | 0.5 | 0 |
| C. E. 2 | 0 | 10 | 0 | 90 | 6 | 70 | 0 | 20 | 2 | 2 |
| Ex. 1 | 0 | 20 | 80 | 0 | 6 | 70 | 0 | 20 | 2 | 2 |
| Ex. 2 | 0 | 30 | 0 | 70 | 16 | 25 | 25 | 25 | 1 | 8 |
| Ex. 3 | 0 | 50 | 0 | 50 | 7 | 60 | 0 | 30 | 1 | 2 |
| Ex. 4 | 0 | 70 | 0 | 30 | 7 | 30 | 30 | 30 | 1 | 2 |
| Ex. 5 | 0 | 80 | 0 | 20 | 7 | 30 | 30 | 30 | 1 | 2 |
| C. E. 3 | 100 | 0 | 0 | 0 | 100 | 0 | 0 | 0 | 0 | 0 |
| C. E. 4 | 100 | 0 | 0 | 0 | 70 | 0 | 0 | 30 | 0 | 0 |

TABLE 4

Results of Examples 1-5 and Comparative Examples CE1-CE4

| Example | $T_g$ (° C.) | $\Delta H_m$ (J/g) | Mw (kg/mol) | G' (Pa) (at 23° C.) | Chemical Resistance Rating |
|---|---|---|---|---|---|
| C. E. 1 | −52 | 15 | 83 | n/a | 1 |
| C. E. 2 | −48 | 0 | n/a | n/a | 1 |
| Ex. 1 | −41 | 0 | 277 | $4 \times 10^4$ | 3 |
| Ex. 2 | −38 | 0 | 384 | $1 \times 10^5$ | 5 |
| Ex. 3 | −26 | 0 | 155 | $1 \times 10^5$ | 5 |
| Ex. 4 | 6 | 0 | 201 | n/a | 5 |
| Ex. 5 | 20 | 0 | 197 | n/a | 5 |
| C. E. 3 | 79 | 35 | 65 | $1 \times 10^9$ | 1 |
| C. E. 4 | 80 | 0 | 75 | $8 \times 10^8$ | 1 |

Example 6

Polyester Tape without Tackifier

To examine the peel adhesion, polyester of Example 3 was hot melt extruded in a twin screw extruder. The extruder melt temperature was controlled at 176° C. and screw speed was 100 rpm. The melt was cast onto a release liner to form an adhesive transfer tape of 50 micrometer thickness. The resulting tape was then tested on a stainless steel substrate by the 180 degree peel test. The peel adhesion was measured to be 2200 g/cm.

Example 7

Polyester Tape with Tackifier

The polyester of Example 3 was hot melt extruded in a twin screw extruder along with a tackifier, FORAL 85 (Eastman Chemical Co, Kingsport, Tenn.), at the composition ratio of 70 wt/30 wt % (Polyester/Foral 85). The extruder melt temperature was controlled at 176° C. and screw speed was 100 rpm. The mixed melt was then cast onto a release liner to form a transfer tape of 50 micrometer thickness. The resulting tape was then tested on a stainless steel substrate by the 180 degree peel test. The peel adhesion was measured to be 2400 g/cm.

Example 8

Polyester Coextruded with Foam Core

An article was made via processing on a coextrusion line. Two hot melt twin-screw extruders were set up side by side. The combination of a 3 layer ABA feedblock and a cast film die were used. The skin extruder, Extruder A, was fed with the polyester of Example 3. The melt temperature on the skin extruder was controlled at 350° F. The screw was run at 100 rpm. A gear pump was used to control the feed rate into the feedblock. The feedblock split the skin PSA melt stream into two and fed them to the outer surface "A" layers. The other extruder, Extruder B, was fed with the following foam composition: KRATON D1161 (Kraton Performance Polymers, Houston Tex.)/CUMAR 130 (Neville Chemical Co., Pittsburgh, Pa.)/ARKON P125 (Arakawa Chemical USA Inc., Chicago, Ill.)/ECOCELL-P (Polyfil corp., Rockaway, N.J.) (53/20/25/2, wt %). The melt temperature on the core extruder was controlled at 350° F. The rheological characteristics of the adhesive layers and core layer were closely matched by adjusting their melt temperatures such that their viscosities are within 30% of each other. The die/feedblock temperature was 350° F. The resulting coextruded ABA articles had good flow and rheological match, resulting in uniform foam/adhesive formation and uniform micro-foam structure. The skin to core ratio was controlled by the feeding ratios from the two extruders such that the split was 1:2:1. The multilayer melt stream was then spread out in the cast film die and then quenched on a chill roll with a double-coated release liner. The sample was then wound up in a roll format. Sample rolls of 2 mil, 4 mil, and 8 mil overall thicknesses were made by adjusting the casting wheel speed.

Example 9

Polyester Coextruded with Foam Core

The polyester polymer used in this Example was synthesized as follows: The polyester polymer was synthesized in a 7.6 liter batch reactor with the following raw material charge:
  isophthalic acid (1221 grams),
  sebacic acid (1553 grams),
  ethylene glycol (1003 grams),
  1,6-hexanediol (1288 grams),
  cyclohexanedimethanol (766 grams),
  trimethylolpropane (24.2 grams),
  trimethylolpropane monoallyl ether (63.7 grams),
  triethyl phosphonoacetate (2.0 g), and
  tetrabutyl titanate (2.0 grams).

All reagents are commonly commercially available. Under a pressure of 20 psig, this mixture was heated to 254° C. while removing water (a reaction by-product). After approximately 541 grams of water was removed, the pressure was gradually reduced to about 1 mmHg while heating to 275° C. The condensation reaction by-product, ethylene glycol, was continuously removed until a polymer with an intrinsic viscosity of 1.2 dL/g (as measured in 60/40 wt. % phenol/o-dichlorobenzene at 23° C.) was produced.

The resulting polyester polymer exhibited a glass transition of −28 C by DSC and a Mw of 200 kg/mol by GPC.

The film was made on a coextrusion line. Two hot melt twin-screw extruders were set up side by side. The combination of a 3 layer ABA feedblock and a cast film die was used. The skin extruder, Extruder A, was fed with the following composition:

50% by weight Polyester Polymer, made as detailed above,

50% by weight SP-560 terpene phenolic resin tackifiers (SI Group, Inc., Schenectady, N.Y.)

The melt temperature of the skin extruder was controlled at 320° F. (160° C.). The screw was run at 200 rpm. A gear pump was used to control the feed rate into the feedblock. The feedblock split the skin adhesive melt stream into two and fed them onto the outer surfaces of the core layer. The other extruder, Extruder B, was fed with the following composition:

39% by weight KRATON D1161 P linear triblock copolymer based on styrene and isoprene, with a polystyrene content of 15% (Kraton Performance Polymers, Houston, Tex.)

5% by weight IonPhasE IPE PE 0107M, a static dissipative polymer (IonPhasE Oy, Tempere, Finland)

5% by weight NUCREL 960 Ethylene-Methacrylic Acid Copolymer (DuPont Co., Wilmington, Del.)

17% by weight CUMAR 130 aromatic hydrocarbon resin (Neville Chem. Co., Pittsburgh, Pa.)

25% by weight ARKON P-125 alicyclic saturated hydrogenated hydrocarbon resin (Arakawa Chem. Ind., Ltd., Osaka, Japan)

6% by weight REMAFIN BLACK 40% black pigment EVA masterbatch (Clariant, Charlotte, N.C.)

1% by weight IRGANOX 1726 multifunctional phenolic antioxidant (BASF Corp., Florham Pk., NJ).

2% by weight ECOCELL-P. foaming agent (Polyfil Corp., Rockaway, N.J.).

The melt temperature of the core extruder was controlled at 350° F. (177° C.). The rheological characteristics of the adhesive layers and core layer were closely matched by adjusting their melt temperatures such that their viscosities were close to each other. The die/feedblock temperature was 330° F. (166° C.). The resulting coextruded multilayer article had good flow properties, resulting in uniform foam/adhesive formation and uniform micro-foam structure. The feeding ratio from the two extruders was controlled at 1.0:2.5 (Skin extruder to Core extruder). The multilayer melt stream was then spread out in the cast film die and then quenched on a chill roll with a double-coated release liner. The sample was then wound up in a roll format. Sample rolls of 11 mil (0.28 mm) overall thicknesses were collected.

The following is a list of exemplary embodiments of the present description.

Embodiment 1 is a polyester comprising:
at least two different diacid residues, the at least two different diacid residues comprising, based on the total moles of the at least two diacid residues:
20 to 80 mole percent of a residue of at least one aromatic dicarboxylic acid; and
20 to 80 mole percent of at least one of a residue of adipic acid or sebacic acid; and
at least three different diol residues, the at least three different diol residues comprising, based on the total moles of the at least three different diol residues:
at least 5 mole percent of a first diol residue;
at least 5 mole percent of a different second diol residue; and
0.1 to 10 mole percent of a residue of trimethylolpropane monoallyl ether, wherein each of the first and second diol residues is a residue of ethylene glycol, 1,6-hexanediol, 1,4-butanediol, neopentyl glycol, or 1,4-cyclohexanedimethanol.

Embodiment 2 is the polyester of Embodiment 1, wherein the residue of the at least one aromatic dicarboxylic acid comprises a residue of at least one of isophthalic acid, phthalic acid, terephthalic acid, bibenzoic acid, and naphthalic acid.

Embodiment 3 is the polyester of Embodiment 1, wherein the at least three different diol residues comprises, based on the total moles of the at least three different diol residues, 0.5 to 5 mole percent of the residue of trimethylolpropane monoallyl ether.

Embodiment 4 is a polyester comprising:
at least two different diacid residues, the at least two different diacid residues comprising, based on the total moles of the at least two diacid residues:
20 to 80 mole percent of a residue of at least one aromatic dicarboxylic acid; and
20 to 80 mole percent of at least one of a residue of adipic acid or sebacic acid; and
at least two different diol residues, the at least two different diol residues comprising, based on the total moles of the at least two different diol residues:
at least 5 mole percent of a first diol residue; and
at least 5 mole percent of a different second diol residue;
wherein each of the first and second diol residues is a residue of ethylene glycol, 1,6-hexanediol, 1,4-butanediol, neopentyl glycol, or 1,4-cyclohexanedimethanol,
wherein the residue of the at least one aromatic dicarboxylic acid comprises a residue of at least one of isophthalic acid, phthalic acid, terephthalic acid, bibenzoic acid, and naphthalic acid, and wherein the polyester is a pressure-sensitive adhesive.

Embodiment 5 is the polyester of Embodiment 4, wherein the at least two different diol residues further comprises, based on the total moles of the at least two different diol residues, 0.1 to 10 percent of a residue of trimethylolpropane monoallyl ether.

Embodiment 6 is the polyester of Embodiment 4, wherein the at least two different diol residues further comprises, based on the total moles of the at least two different diol residues, 0.5 to 5 percent of a residue of trimethylolpropane monoallyl ether.

Embodiment 7 is a polyester comprising:
at least two different diacid residues comprising, based on the total moles of the at least two diacid residues:
20 to 80 mole percent of a residue of at least one aromatic dicarboxylic acid; and
at least two different diol residues comprising, based of the total moles of the at least two different diol residues:
0.1 to 10 mole percent of a diol residue comprising a pendant group containing an alkenyl group,
wherein the residue of the at least one aromatic dicarboxylic acid comprises a residue of at least one of isophthalic acid, phthalic acid, terephthalic acid, bibenzoic acid, and naphthalic acid, and wherein the polyester is a pressure-sensitive adhesive.

Embodiment 8 is the polyester of Embodiment 7, wherein the at least two different diol residues comprises, based of the total moles of the at least two different diol residues, 0.5 to 5 mole percent of the diol residue comprising the pendant group containing the alkenyl group.

Embodiment 9 is a polyester comprising:
  at least two different diacid residues comprising, based on a total moles of the at least two different diacid residues:
    20 to 80 mole percent at least one aromatic dicarboxylic acid residue; and at least two different diol residues,
wherein the polyester comprises at least one pendant group containing an alkenyl group, a ratio of a total number of the at least one pendant group to the total number of ester groups in the polyester being in a range of 0.001 to 0.1,
wherein the residue of the at least one aromatic dicarboxylic acid comprises a residue of at least one of isophthalic acid, phthalic acid, terephthalic acid, bibenzoic acid, and naphthalic acid, and wherein the polyester is a pressure-sensitive adhesive.

Embodiment 10 is the polyester of Embodiment 9, wherein at least one of the two different diol residues comprise the at least one pendant group containing the alkenyl group.

Embodiment 11 is the polyester of Embodiment 9, wherein at least one of the two different diacid residues comprise the at least one pendant group containing the alkenyl group.

Embodiment 12 is the polyester of Embodiment 9, wherein the at least two different diol residues comprise, based on the total moles of the at least two different diol residues, 0.1 to 10 mole percent of a residue of trimethylolpropane monoallyl ether.

Embodiment 13 is the polyester of Embodiment 9, wherein the at least two different diol residues comprise, based on the total moles of the at least two different diol residues, 0.5 to 5 mole percent of a residue of trimethylolpropane monoallyl ether.

Embodiment 14 is the polyester of Embodiment 9, wherein the alkenyl group is an allyl group.

Embodiment 15 is the polyester of Embodiment 14, wherein the alkenyl group is an allyloxy group.

Embodiment 16 is a crosslinked polyester preparable by at least partially curing the polyester of any of one of Embodiments 1 to 15.

Embodiment 17 is the crosslinked polyester of Embodiment 16 being a pressure-sensitive adhesive.

Embodiment 18 is the polyester of any of one of Embodiments 1 to 15 having a polydispersity index in a range of 3 to 60.

Embodiment 19 is the polyester of Embodiment 18, wherein the polydispersity index is in a range of 3 to 30.

Embodiment 20 is the polyester of Embodiment 18, wherein the polydispersity index is in a range of 3 to 20.

Embodiment 21 is a pressure-sensitive adhesive composition comprising the polyester of any one of Embodiments 1 to 15 or the crosslinked polyester of any one of Embodiments 16 to 17, and 1 to 60 weight percent tackifier.

Embodiment 22 is the pressure-sensitive adhesive composition of Embodiment 21 comprising 1 to 30 weight percent of the tackifier.

Embodiment 23 is the pressure-sensitive adhesive composition of Embodiment 21 comprising 1 to 15 weight percent of the tackifier.

Embodiment 24 is the polyester of any one of Embodiments 1 to 15 having a weight-average molecular weight in a range of 40 to 4000 kg/mole.

Embodiment 25 is the polyester of Embodiment 24, wherein the weight-average molecular weight is at least 100 kg/mole.

Embodiment 26 is the polyester of Embodiment 24, wherein the weight-average molecular weight is at least 200 kg/mole.

Embodiment 27 is the polyester any one of Embodiments 1 to 15 or the crosslinked polyester of any one of Embodiments 16 to 17 having a glass transition temperature, as determined by differential scanning calorimetry, in a range of −60° C. to −10° C.

Embodiment 28 is the polyester of Embodiment 27, wherein the glass transition temperature is below −20° C.

Embodiment 29 is the polyester of Embodiment 27, wherein the glass transition temperature is below −30° C.

Embodiment 30 is the polyester any one of Embodiments 1 to 15 or the crosslinked polyester of any one of Embodiments 16 to 17 having a shear modulus, G', at 1 Hz and 23° C., as determined by dynamical mechanical analysis, in a range of 0.001 MPa to 1 MPa.

Embodiment 31 is the polyester of Embodiment 30, wherein the shear modulus is less than 0.5 MPa.

Embodiment 32 is the polyester of Embodiment 30, wherein the shear modulus is less than 0.3 MPa.

Embodiment 33 is the polyester any one of Embodiments 1 to 15 or the crosslinked polyester of any one of Embodiments 16 to 17 having a crystallinity, as determined by the heat of melting determined by differential scanning calorimetry (DSC), of less than 5 J/g.

Embodiment 34 is the polyester of Embodiment 33, wherein the crystallinity is less than 1 J/g.

Embodiment 35 is a tape comprising a substrate and the polyester of any one of Embodiments 1 to 15 or the crosslinked polyester of any one of Embodiments 16 to 17 disposed on the substrate.

Embodiment 36 is the tape of Embodiment 35, having a peel strength of at least 300 g/cm when tested at a 180 degree peel from a stainless steel substrate at a peel rate of 300 mm/minute.

Embodiment 37 is the tape of Embodiment 35, wherein the peel strength is at least 1000 g/cm.

Embodiment 38 is the tape of Embodiment 35, wherein the peel strength is at least 2000 g/cm.

Embodiment 39 is a tape comprising a first layer, a second layer and a third layer, the first layer disposed directly on a first major surface of the second layer, the third layer disposed directly on a second major surface of the second layer opposite the first major surface of the second layer, the first and third layers comprising the polyester any one of Embodiments 1 to 15 or the crosslinked polyester of any one of Embodiments 16 to 17.

Embodiment 40 is the tape of Embodiment 39, wherein the second layer comprises a polyester comprising a residue of at least one aromatic dicarboxylic acid.

Embodiment 41 is the tape of Embodiment 40, wherein the second layer is a foamed layer.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:
1. A polyester comprising:
  at least two different diacid residues, the at least two different diacid residues comprising, based on the total moles of the at least two diacid residues:
    20 to 80 mole percent of a residue of at least one aromatic dicarboxylic acid; and

20 to 80 mole percent of at least one of a residue of adipic acid or sebacic acid; and
at least three different diol residues, the at least three different diol residues comprising, based on the total moles of the at least three different diol residues:
at least 5 mole percent of a first diol residue;
at least 5 mole percent of a different second diol residue; and
0.1 to 10 mole percent of a residue of trimethylolpropane monoallyl ether,
wherein each of the first and second diol residues is a residue of ethylene glycol, 1,6-hexanediol, 1,4-butanediol, neopentyl glycol, or 1,4-cyclohexanedimethanol, and
wherein the polyester has a crystallinity, as determined by the heat of melting determined by differential scanning calorimetry, of less than 5 J/g.

2. The polyester of claim 1, wherein the residue of the at least one aromatic dicarboxylic acid comprises a residue of at least one of isophthalic acid, phthalic acid, terephthalic acid, bibenzoic acid, and naphthalic acid.

3. The polyester of claim 1, wherein the at least three different diol residues comprises, based on the total moles of the at least three different diol residues, 0.5 to 5 mole percent of the residue of trimethylolpropane monoallyl ether.

4. A polyester comprising:
at least two different diacid residues, the at least two different diacid residues comprising, based on the total moles of the at least two diacid residues:
20 to 80 mole percent of a residue of at least one aromatic dicarboxylic acid; and
20 to 80 mole percent of at least one of a residue of adipic acid or sebacic acid; and
at least two different diol residues, the at least two different diol residues comprising, based on the total moles of the at least two different diol residues:
at least 5 mole percent of a first diol residue; and
at least 5 mole percent of a different second diol residue;
wherein each of the first and second diol residues is a residue of ethylene glycol, 1,6-hexanediol, 1,4-butanediol, neopentyl glycol, or 1,4-cyclohexanedimethanol,
wherein the residue of the at least one aromatic dicarboxylic acid comprises a residue of at least one of isophthalic acid, phthalic acid, terephthalic acid, bibenzoic acid, and naphthalic acid,
wherein the polyester is a pressure-sensitive adhesive, and
wherein the polyester has a crystallinity, as determined by the heat of melting determined by differential scanning calorimetry, of less than 5 J/g.

5. The polyester of claim 4, wherein the at least two different diol residues further comprises, based on the total moles of the at least two different diol residues, 0.1 to 10 mole percent of a residue of trimethylolpropane monoallyl ether.

6. The polyester of claim 4, wherein the at least two different diol residues further comprises, based on the total moles of the at least two different diol residues, 0.5 to 5 mole percent of a residue of trimethylolpropane monoallyl ether.

7. A polyester comprising:
at least two different diacid residues, based on the total moles of the at least two diacid residues:
20 to 80 mole percent of a residue of at least one aromatic dicarboxylic acid; and
at least two different diol residues comprising, based of the total moles of the at least two different diol residues:
0.1 to 10 mole percent of a diol residue comprising a pendant group containing an alkenyl group,
wherein the residue of the at least one aromatic dicarboxylic acid comprises a residue of at least one of isophthalic acid, phthalic acid, terephthalic acid, bibenzoic acid, and naphthalic acid, wherein the polyester is a pressure-sensitive adhesive, and
wherein the polyester has a crystallinity, as determined by the heat of melting determined by differential scanning calorimetry, of less than 5 J/g.

8. The polyester of claim 7, wherein the at least two different diol residues comprises, based on the total moles of the at least two different diol residues, 0.5 to 5 mole percent of the diol residue comprising the pendant group containing the alkenyl group.

9. A polyester comprising:
at least two different diacid residues comprising, based on a total moles of the at least two different diacid residues:
20 to 80 mole percent at least one aromatic dicarboxylic acid residue; and
at least two different diol residues,
wherein the polyester comprises at least one pendant group containing an alkenyl group, a ratio of a total number of the at least one pendant group to a total number of ester groups in the polyester being in a range of 0.001 to 0.1,
wherein the residue of the at least one aromatic dicarboxylic acid comprises a residue of at least one of isophthalic acid, phthalic acid, terephthalic acid, bibenzoic acid, and naphthalic acid,
wherein the polyester is a pressure-sensitive adhesive, and
wherein the polyester has a crystallinity, as determined by the heat of melting determined by differential scanning calorimetry, of less than 5 J/g.

10. The polyester of claim 9, wherein at least one of the two different diol residues comprise the at least one pendant group containing the alkenyl group.

11. The polyester of claim 9, wherein at least one of the two different diacid residues comprise the at least one pendant group containing the alkenyl group.

12. The polyester of claim 9, wherein the at least two different diol residues comprise, based on the total moles of the at least two different diol residues, 0.1 to 10 mole percent of a residue of trimethylolpropane monoallyl ether.

13. The polyester of claim 9, wherein the at least two different diol residues comprise, based of the total moles of the at least two different diol residues, 0.5 to 5 mole percent of a residue of trimethylolpropane monoallyl ether.

14. The polyester of claim 9, wherein the alkenyl group is an allyl group.

15. The polyester of claim 14, wherein the alkenyl group is an allyloxy group.

16. A pressure-sensitive adhesive composition comprising the polyester of claims 1, and 1 to 60 weight percent tackifier.

17. A tape comprising a substrate and the polyester of claim 1 disposed on the substrate.

18. A crosslinked polyester preparable by at least partially curing the polyester of claim 1.

19. A pressure-sensitive adhesive composition comprising the crosslinked polyester of claims 18, and 1 to 60 weight percent tackifier.

20. A tape comprising a substrate and the crosslinked polyester of claim 18 disposed on the substrate.

21. The polyester of claim 1, wherein the crystallinity is substantially zero.

* * * * *

UNITED STATES PATENT AND TRADEMARK OFFICE
CERTIFICATE OF CORRECTION

PATENT NO. : 10,550,224 B2  
APPLICATION NO. : 15/752988  
DATED : February 4, 2020  
INVENTOR(S) : Richard Liu Page 1 of 1

It is certified that error appears in the above-identified patent and that said Letters Patent is hereby corrected as shown below:

On the Title Page

<u>In Column 1, under Inventors</u>
Line 5, delete "White Lake Bear," and insert -- White Bear Lake, --, therefor.

In the Claims

<u>Column 24</u>
Line 56, in Claim 16, delete "claims" and insert -- claim --, therefor.
Line 64, in Claim 19, delete "claims" and insert -- claim --, therefor.

Signed and Sealed this
Eighteenth Day of August, 2020

Andrei Iancu
*Director of the United States Patent and Trademark Office*